(12) United States Patent
Myers et al.

(10) Patent No.: US 7,143,510 B2
(45) Date of Patent: Dec. 5, 2006

(54) METHOD OF FABRICATING A SHAFT ASSEMBLY

(75) Inventors: Christopher Alan Myers, Holly, MI (US); Douglas James Bradley, Howell, MI (US); Edward A. Umin, Rockwood, MI (US); Ronald Oral Holcomb, Birmingham, MI (US); Steven Lum, Farmington Hills, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 4 days.

(21) Appl. No.: 10/740,327

(22) Filed: Dec. 18, 2003
(Under 37 CFR 1.47)

(65) Prior Publication Data
US 2004/0148776 A1 Aug. 5, 2004

Related U.S. Application Data

(62) Division of application No. 09/965,316, filed on Sep. 27, 2001, now abandoned.

(51) Int. Cl.
*B21D 53/84* (2006.01)
*B21D 39/00* (2006.01)
*B23P 11/00* (2006.01)

(52) U.S. Cl. .................... 29/881.1; 29/507; 29/508; 29/506

(58) Field of Classification Search ............ 29/505, 29/506, 507, 508, 421.1, 419.1, 888.1; 72/58, 72/56, 61, 370.08; 403/277, 285; 285/256; 295/256
See application file for complete search history.

(56) References Cited

U.S. PATENT DOCUMENTS

| 3,561,798 A | * | 2/1971 | Redfern ...................... 403/369 |
| 4,041,599 A | | 8/1977 | Smith |
| 4,089,190 A | | 5/1978 | Worgan et al. |
| 4,171,626 A | | 10/1979 | Yates et al. |
| 4,187,135 A | | 2/1980 | Yates et al. |
| 4,236,386 A | | 12/1980 | Yates et al. |
| 4,238,539 A | * | 12/1980 | Yates et al. ................ 428/35.9 |
| 4,238,540 A | | 12/1980 | Yates et al. |

(Continued)

FOREIGN PATENT DOCUMENTS

GB    2017567 A    10/1979

(Continued)

*Primary Examiner*—John C. Hong

(57) ABSTRACT

An assembly provides metallic ends to a composite shaft and a method of fabricating such an assembly. The composite shaft is preferably comprised of reinforced fibers. A metallic inner sleeve is positioned in the cavity of one end of the shaft. A metallic outer sleeve is positioned around the end of the shaft having the inner sleeve therein. The outer sleeve may include structural features, such as dimples, that ensure a stable connection between the sleeve and the shaft. The sleeves are compressibly forced onto the shaft, thereby forming the assembly. Both sleeves are metallic, and therefore provide a surface onto which weld joints can be formed. A preferred method of assembly includes the steps of expanding the inner sleeve and compressing the outer sleeve against the shaft.

18 Claims, 4 Drawing Sheets

U.S. PATENT DOCUMENTS

| | | |
|---|---|---|
| 4,248,062 A | 2/1981 | McLain et al. |
| 4,265,951 A | 5/1981 | Yates et al. |
| 4,275,122 A | 6/1981 | Fisher |
| 4,451,245 A | 5/1984 | Hornig et al. |
| 4,654,478 A * | 3/1987 | Ishihara et al. ............. 174/176 |
| 4,706,364 A | 11/1987 | Aubry |
| 4,715,739 A | 12/1987 | Ruegg et al. |
| 4,722,717 A | 2/1988 | Salzman et al. |
| 4,834,932 A | 5/1989 | Salzman et al. |
| 4,952,195 A | 8/1990 | Traylor |
| 5,127,157 A * | 7/1992 | Oetiker ................. 29/890.144 |
| 5,199,751 A * | 4/1993 | Beagle et al. ................ 285/256 |
| 5,253,947 A * | 10/1993 | Petrzelka et al. ........... 403/274 |
| 5,277,661 A | 1/1994 | Mak et al. |
| 5,511,603 A | 4/1996 | Brown et al. |
| 5,665,187 A | 9/1997 | Mackellar |
| 5,836,825 A | 11/1998 | Yamane |
| 6,484,384 B1 * | 11/2002 | Gibson et al. ................ 29/516 |

FOREIGN PATENT DOCUMENTS

| | | |
|---|---|---|
| GB | 2051303 A | 1/1981 |

* cited by examiner

METHOD OF FABRICATING A SHAFT ASSEMBLY

CROSS-REFERENCE TO RELATED PATENT APPLICATIONS

This patent application is a divisional of U.S. patent application Ser. No. 09/965,316, filed Sep. 27, 2001, now abandoned.

FIELD OF THE INVENTION

The present invention relates to an assembly of a composite shaft and metallic sleeves. More specifically, the present invention relates to an assembly that comprises inner and outer metallic sleeves mechanically secured to a composite shaft. The invention also provides a method for fabricating such an assembly.

BACKGROUND OF THE INVENTION

Composite shafts are typically made in tubular form and are comprised of fiber reinforced plastic material. The fibers can be any number of fibrous materials, including glass and synthetic polymers. The reinforcing fibers are wound around the tubular composite, and are typically arranged such that they intersect each other at various angles.

Composite shafts have been used in a variety of applications, including vehicle drive shafts. U.S. Pat. No. 4,041,599 to Smith illustrates such an application of a composite shaft and is herein incorporated by reference in its entirety.

Due to their composite nature and structure, composite shafts offer several advantages over metal shafts. For example, composite shafts are significantly lighter in weight than metal shafts, thereby making them easy to transport and manipulate during subsequent manufacturing. Also, their light weight reduces their contribution to the overall weight of the article into which they are incorporated, such as a motor vehicle. Furthermore, composite shafts are more resistant to corrosion and other damaging processes than metal shafts. Lastly, primarily due to the arrangement of the fibers in the shaft, composite shafts have high strength and are able to withstand high degrees of stress.

Due to the use of fibrous materials, it can prove difficult to create a joint between a composite shaft and a metal member, such as a hub. Direct weld joints between composite shafts and metal do not normally create strong and durable connections on a consistent and reliable basis. Many approaches to overcoming this disadvantage have been proposed. For example, the use of metallic sleeves to provide a metal surface onto which weld joints can be formed has been proposed. Furthermore, many techniques for securing such sleeves to composite shafts have been explored. U.S. Pat. No. 4,265,951 to Yates et al. discloses the integral formation of metallic connector sleeves in the composite shaft. Another method of securing the sleeves to the shaft employs an adhesive. For example, U.S. Pat. No. 4,722,717 to Salzman et al. discloses a series of grooves on the metallic insert and the composite shaft. When aligned, the grooves form keyways into which adhesive material can be injected. Once polymerized, the adhesive forms a bond between the metallic insert and the composite shaft. Lastly, temperature dependent methods of securing a metallic sleeve to a composite shaft have been proposed. For example, a frozen metallic sleeve can be inserted into a composite shaft and subsequently warmed to expand the metal. In its expanded state, the sleeve is in compression against the shaft.

These various approaches to securing metallic sleeves to composite shafts, although effective, include several disadvantages. For example, integral formation of sleeves onto a shaft requires attachment of the sleeve at the time of manufacturing the shaft. This requirement may inhibit the manufacturing process and furthermore may inhibit other uses of the composite shaft. The use of adhesives requires delicate manufacturing techniques. Lastly, temperature dependent methods require precise control over manufacturing conditions and the manufacturing environment, adding time and expense to the manufacturing process.

Due to the significant advantages offered by composite shafts, demand for these shafts is currently increasing for a variety of applications, including automobile driveshafts. Therefore, there is a need for an assembly that provides a stable surface onto which weld joints can be formed without adding any additional disadvantages, such as burdensome complications to the fabrication process. Furthermore, there is a need for a method of producing such an assembly.

SUMMARY OF THE INVENTION

The present invention provides an assembly of a composite shaft and metallic sleeves, thereby providing a surface onto which a weld joint can be applied. The assembly of the present invention comprises a composite tubular shaft and inner and outer metallic sleeves. The inner and outer sleeves are adjacent the inner and outer surfaces, respectively, of the composite shaft. The present invention further provides a method for fabricating such an assembly.

DETAILED DESCRIPTION OF THE PREFERRED EMBODIMENTS

Figure 1:
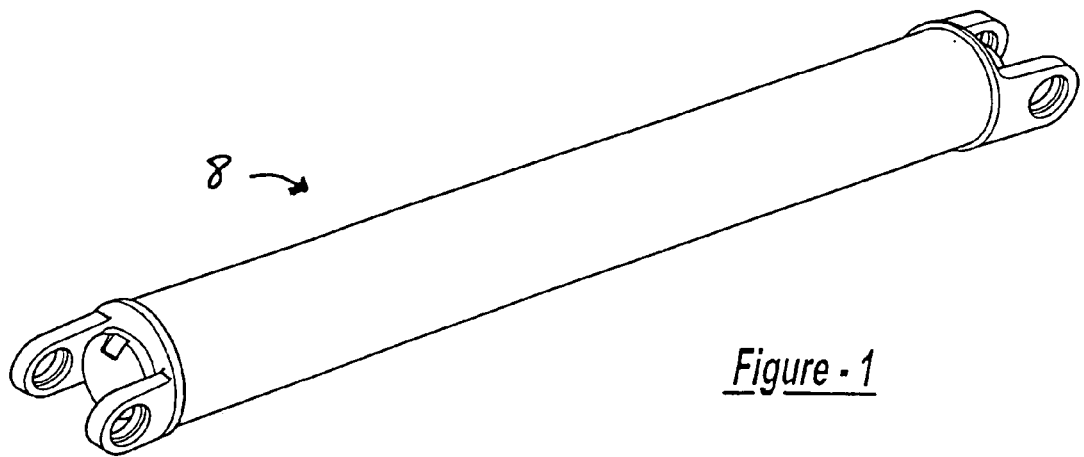
FIG. 1 is a perspective view of a composite vehicle driveshaft.

FIG. 1 illustrates a composite vehicle driveshaft 8 that can be utilized in conjunction with the present invention.

Figure 2:
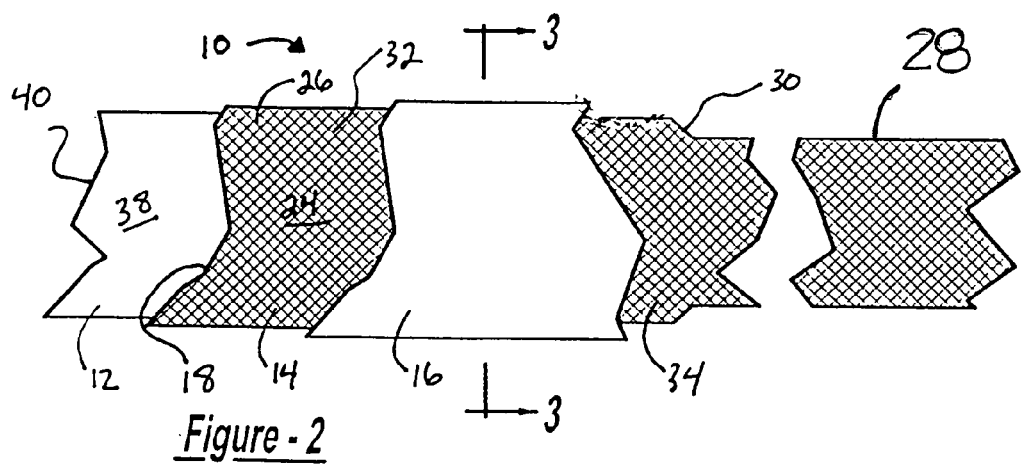
FIG. 2 is a fragmentary view of the shaft assembly partially sectioned, in accordance with the present invention.

FIG. 2 illustrates an assembly 10 in accordance with the present invention. The assembly 10 comprises an inner sleeve 12, a composite shaft 14 and an outer sleeve 16. The shaft 14 is preferably a tubular member forming an inner cavity 18 and an opening 20. The shaft 14 has an inner surface 22 that defines the boundary of the inner cavity 18, and also has an outer surface 24 which is opposite the inner cavity 18.

In the preferred embodiment, a composite driveshaft 8 is used as the shaft 14. The invention is not limited to this application, however. Rather, the invention can be utilized in any application where there is a need to create a load carrying metallic interface with a composite shaft. Further examples of suitable shafts include, but are not limited to, tie rods, steering columns, and half shafts.

The composite shaft 14 includes an end portion 26 and a body portion 28. Between the end portion 26 and body portion 28, the shaft 14 may further include a tapered portion 30. The shaft 14 is a structural composite tubular shaft known in the art and is comprised of fiber filament reinforced material 32. The material 32 provides the structure of the shaft 14 and comprises, at least on its outer surface, a series of wound fibers or filaments 34. Preferably, several layers of fibers or filaments 34 are successively wound around each other, with the fibers or filaments 34 of each layer situated at different angles to previous layers. This arrangement of fibers or filaments 34 confers strength onto the composite shaft 14.

Techniques for manufacturing the composite shaft 14 are known in the art, and will not be described in detail herein. Typically, layers of resin-coated filaments are wound successively upon each other. A mandrel is used to support the developing shaft. The fibers or filaments 34 may be boron, glass, carbon, graphite, kevlar, spectra, spectran or any other natural or synthetic fiber or filament, or any combination thereof. The fibers selected will depend on the characteristics needed, such as strength and overall shaft weight, for the application to which the assembly 10 will ultimately be used. For driveshaft applications, carbon fibers are preferred due to their light weight and relative strength. Alternatively, any other suitable natural or synthetic fiber of filament, or any combination thereof, may be used.

The shaft 14 preferably has a circular cross-sectional shape. Alternatively, however, the shaft 14 can have any cross-sectional shape appropriate for the application to which the assembly 10 will be used. Examples of alternative cross-sectional shapes include square, rectangular, triangular, and hexagonal shapes. The only limitation on the cross-sectional shape of the shaft 14 is that the shaft must be able to receive both the inner 12 and outer 16 sleeves in accordance with the present invention.

The end portion 26 of shaft 14 provides the inner 22 and outer 24 surfaces onto which the assembly 10 of the present invention is formed. The inner cavity 18 and its opening 20 allow the inner sleeve 12 to be slideably disposed therein.

Essentially, the cavity 18 can be any size. Preferably, as will be developed more fully below, the cavity 18 is of a size that allows minimal clearance of the inner sleeve 12 when the inner sleeve 12 is disposed therein.

As best illustrated in FIG. 2, the shaft 14 preferably includes a taper portion 30 between the end 26 and body portions 28. The taper portion 30 preferably defines structural features that assist positioning of the inner sleeve 12 in the cavity 18 of the end portion 26. For example, the taper portion 30 may define a slant on the inner surface 22 of the shaft 14. One end of the inner sleeve 12 may define a complimentary slant such that, when the inner sleeve 12 is placed into the cavity 18, a stopping point is reached when the complimentary slants come into contact. Alternatively, the shaft 14 may not include a taper portion 30.

The inner sleeve 12 is preferably a metal member that fits within the inner cavity 18 of the shaft 14. Any metal suitable for providing a weld surface can be utilized for the inner sleeve 12. Due to its light weight, ready availability, and ability to form strong weld joints on its surface, aluminum is preferred. Alternatively, steel or any other suitable metal, alloy, or other material can be used for the inner sleeve.

Similar to the shaft 14, the inner sleeve 12 is preferably a tubular member having interior 36 and exterior 38 surfaces and defining a cavity 40. The cavity 40 of the inner sleeve 12 can essentially be any size and shape. The size and shape of the cavity 40 defined by the inner sleeve 12 will depend on the application for which the assembly 10 is used. Alternatively, the inner sleeve 12 may be a solid member, not defining a cavity at all. In this embodiment, the inner sleeve 12 effectively defines a solid plug that fits within the cavity 18 of the shaft 14. This embodiment allows additional surface area for supporting a weld joint, among other benefits. In additional alternate embodiments, the inner sleeve 12 can have any form that allows the inner 12 and outer 16 sleeves to be positioned within and around, respectively, the shaft 14 in accordance with the present invention, as will be developed more fully below.

The inner sleeve 12 preferably has a circular cross-sectional shape. Alternatively, however, the inner sleeve 12 can have any cross-sectional shape appropriate to the application to which the assembly 10 will be used. Examples of alternative cross-sectional shapes include square, rectangular, triangular, and hexagonal shapes. It is preferred that the exterior surface 38 of the inner sleeve 12 have a shape complimentary to the inner surface 22 of the shaft 14. This does not, however, dictate that the cavity 40 defined by the inner sleeve 12 have a similar shape. Indeed the exterior surface 38 and cavity 40 of the inner sleeve 12 can have two completely different shapes. For example, the exterior surface 38 can be circular in nature, complimentary to a tubular shaft 14, while the cavity 40 of the inner sleeve 12 defines a square, rectangular, triangular or hexagonal shape.

Figure 4:
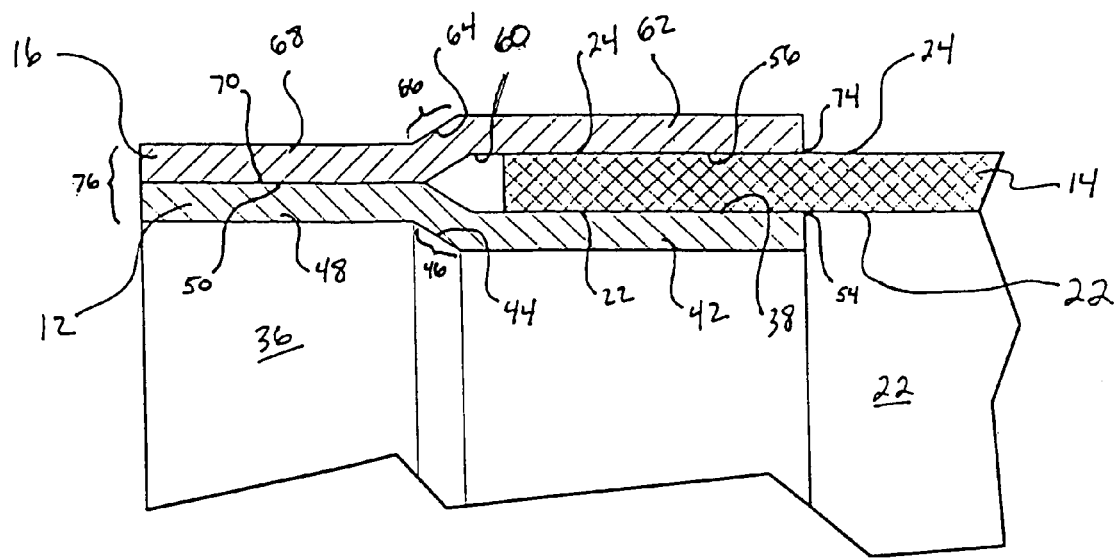
FIG. 4 is a partial cross-sectional view of a preferred embodiment of the shaft assembly in accordance with the present invention.
Figure 5:
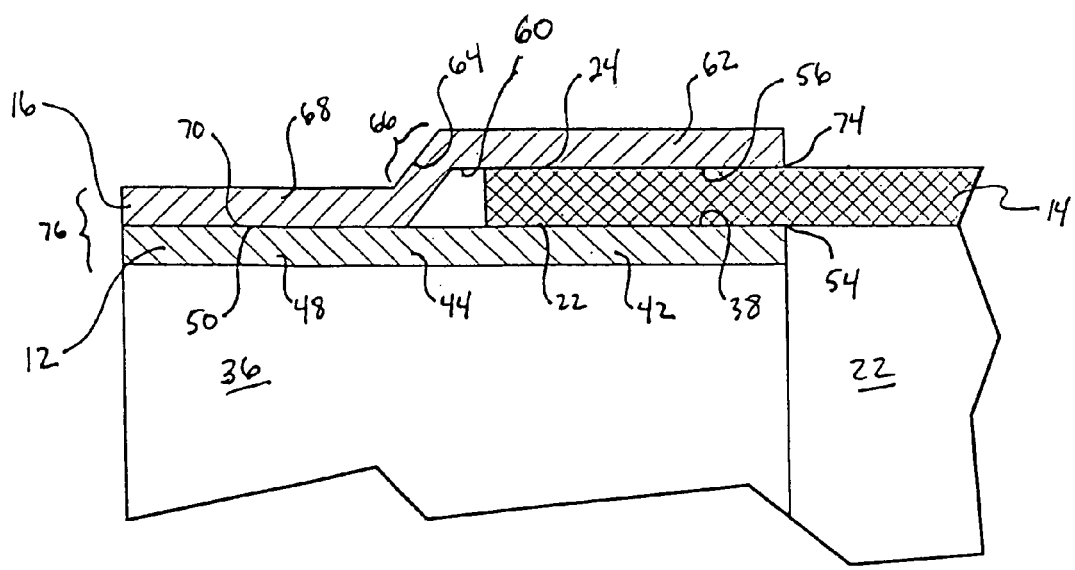
FIG. 5 is a partial cross-sectional view of an alternate embodiment of the shaft assembly in accordance with the present invention.

The inner sleeve 12 may slide within the cavity 18 of the shaft 14 in its entirety. In a preferred embodiment, however, the inner sleeve 12 defines three distinct regions. As shown in FIG. 4, a first region 42 slideably fits into the cavity 18 of the shaft 14 in accordance with the description of the inner sleeve 12 above. A conical region 44 defines an angle 46 in the inner sleeve 12. The angle preferably extends the inner sleeve 12 outward from the cavity 18 of the shaft 14. However, any type of bend, kink, or other disruption in the inner sleeve 12 may be used as the angle 46. It will be appreciated that, as shown in FIG. 4, the angle 46 preferably defines a structural feature in the inner sleeve 12 that inhibits further insertion of the inner sleeve 12 into the cavity 18 of the shaft 14 once the angle 46 comes into contact with opening 20 of the shaft 14. An outer region 48 of the inner sleeve 12 of this embodiment defines a flange 50. The flange provides surface area onto which a weld joint or other joint can be located. For example, as shown in FIGS. 4 and 5, the flange 50 can support a weld joint to a portion of the outer sleeve 16 or a separately attached member. Also, the flange 50 may define elements, such as through openings, threaded openings, projections, clips, hooks, or other structural features that facilitate correction of the inner sleeve 12 to the outer sleeve 16 and/or other members. As shown in FIG. 4, it is preferable that the angle 46 is of a configuration such that the top surface of the flange 50 is located at approximately the midpoint of the thickness of the shaft 14.

In an alternate embodiment, as shown in FIG. 5, the inner sleeve 12 may not include an angle 46, effectively defining a continuous surface. This embodiment facilitates the process of fabricating the assembly 10 of the present invention.

No matter the form of the inner sleeve 12, the outer diameter 52 must allow at least the first region 42 to fit within the cavity 18 of the shaft. The clearance 54 between the exterior surface 38 of the inner sleeve 12 and the cavity 18 of the shaft 13 is preferably large enough to allow the inner sleeve 12 to slide within the cavity 18, but small enough to minimize the force needed to place the inner sleeve 12 in adjacent the inner surface 22 of the shaft 14 during fabrication of the assembly 10. Considering these preferences, a clearance 54 of between approximately 0.1 and 1.0 mm is preferred, and a clearance of approximately 0.4 mm is particularly preferred.

Similar to the inner sleeve 12, the outer sleeve 16 is preferably a metal member. Thus, any metal suitable for providing a weld surface can be used as the outer sleeve 16. Again, due to its relatively light weight and ability to form strong weld joints, aluminum is preferred. Alternatively, steel or any other metal, alloy, or other material can be used.

The outer sleeve 16 is preferably a tubular member having interior 56 and exterior 58 surfaces and defining a cavity 60. The outer sleeve 16 fits over the end portion 26 of the composite shaft 14. Thus, the cavity 60 of the outer sleeve 16 can be essentially any size and shape so long as it is capable of receiving the end portion 26 of the shaft 14. The size and shape of the cavity 60 of the outer sleeve 16 will therefore depend on the configuration of the end portion 26 of the shaft 14.

The outer sleeve 16 preferably has a circular cross-sectional shape. Alternatively, however, the outer sleeve 16 can have any cross-sectional shape appropriate to the application to which the assembly 10 will be used. For example, the outer sleeve 16 can have a square, rectangular, triangular, or hexagonal cross-sectional shape. It is preferred that the cavity 60 of the outer sleeve 16 have a shape complimentary to the outer surface 24 of the shaft 14. This does not dictate that the exterior surface 58 of the outer sleeve 16 have a similar shape. The exterior surface 58 and cavity 60 can have two completely different shapes. For example, the cavity 60 can define a circular cross-section, complimentary to a tubular shaft 14, while the exterior surface 58 defines a square, rectangular, or triangular shape.

Figure 3:
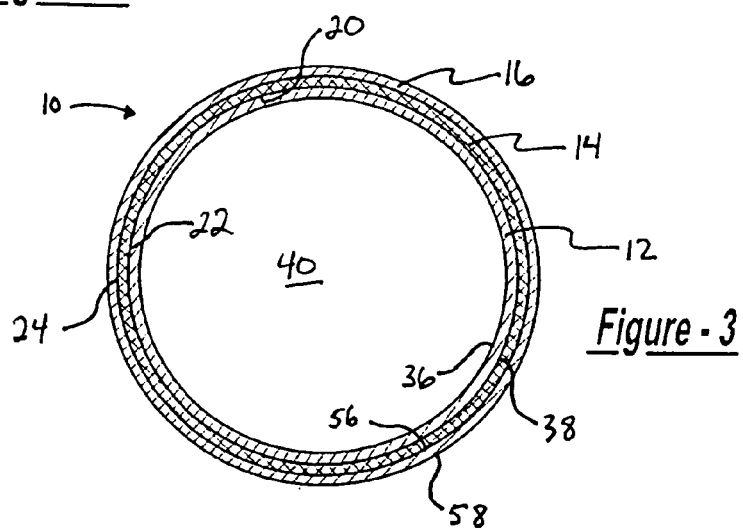
FIG. 3 is a cross sectional view of the assembly taken along the line 3—3 in FIG. 2.

The outer sleeve 16 may slide over the outer surface 24 of the end portion 26 of the shaft 14 in its entirety. In a preferred embodiment, however, the outer sleeve 16 defines three distinct regions. This embodiment is illustrated in FIG. 3. A first region 62 slideably fits over the outer surface 24 of the end portion 26 of the shaft 14 in accordance with the description of the outer sleeve 16 above. A conical region 64 defines an angle 66 in the outer sleeve 16. The angle 66 preferably extends the outer sleeve 16 toward the cavity 18 of the shaft. However, any type of bend, kink, or other disruption in the outer sleeve 16 may be used as the angle 66. It will be appreciated that the angle 66 may define a structural feature in the outer sleeve 16 that inhibits further movement of the outer sleeve along the shaft 14 once the angle 66 comes into contact with the opening 20 of the shaft.

An outer region 68 of the outer sleeve 16 of this embodiment defines a flange 70. The flange 70 provides surface area onto which a weld joint or the joint can be located. For example, as shown in FIGS. 3 and 4, the flange 70 can support a weld joint to the flange 50 of the inner sleeve or a separately attached member. Also, the flange 70 may define elements, such as through openings, threaded openings, projections, clips, hooks, or other structural features that facilitate connection of the outer sleeve 16 to the inner sleeve 12 and/or other members. As illustrated in FIG. 3, it is preferable that the angle 66 of the outer sleeve 16 be such that the outer sleeve is essentially a mirror image of the inner sleeve 12. This allows the top of the inner sleeve flange 50 and bottom of the outer sleeve flange 70 to meet at approximately the midpoint of the thickness of the shaft 14. In an alternate embodiment, shown in FIG. 4, the angle 66 is such that the interface between the two flanges 50, 70 is located at a position that corresponds to approximately the inner surface 22 of the shaft 14. In this embodiment, the inner sleeve 12 has a continuous surface, i.e., there is no angle 46. Of course, any combination of the two angles 46, 66 can be utilized to place the flanges 50, 70 at a desired location relative to the shaft 14.

No matter the form of the outer sleeve 16, the inner diameter must allow at least the first region 62 to fit over the end portion 26 of the shaft 14. The clearance between the interior surface 56 of the outer sleeve 16 and the shaft 14 is preferably large enough to allow the outer sleeve 16 to slide over the end portion 26 of the shaft 14, but small enough to minimize the force needed to place the outer sleeve 16 adjacent the outer surface 24 of the shaft 14 during fabrication of the assembly 10. Considering these preferences, a clearance 74 of between approximately 0.1 and 1.0 mm is preferred, and a clearance 74 of approximately 0.4 mm is particularly preferred.

Preferably, the two flanges 50, 70 are secured to each other, forming an edge 76. It is preferred to use a weld joint to secure the flanges 50, 70 to each other. Alternatively, any type of fastening or securement means can be used, such as rivets, threaded fasteners with bolts, and adhesives.

As best illustrated in FIGS. 3 and 4, when the inner 12 and outer 16 sleeves are in position within and about, respectively, the composite shaft 14, one surface of each sleeve 12, 16 is preferably in contact with one surface of the shaft 14. Preferably, each area of contact between the sleeve 12, 16 and the shaft 14 constitutes a continuous interface line. That is, it is preferred that contact exist over the entire area of interface between the sleeves 12, 16 and the shaft 14. Alternatively, contact may be intermittent in nature. Also preferably, the contact between the exterior surface 38 of the inner sleeve 12 and the inner surface 22 of the shaft 14, and the interior surface 56 of the outer sleeve 16 and the outer surface 24 of the shaft 14 constitutes a flat interface.

Figure 6:
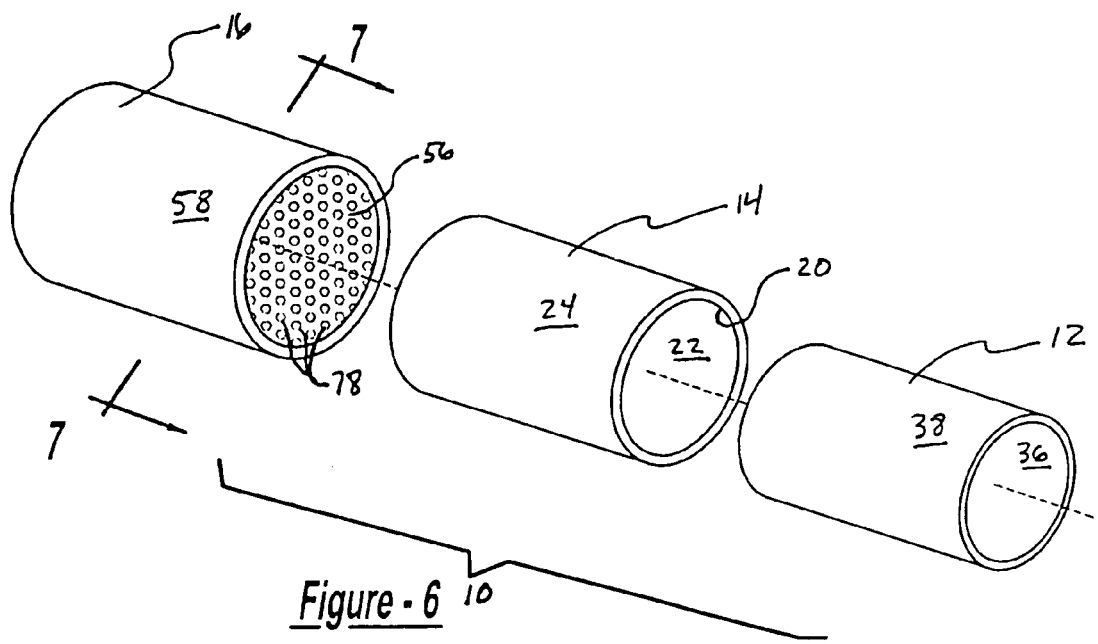
FIG. 6 is fragmentary view of a preferred embodiment of the shaft assembly according to the present invention.
Figure 7:
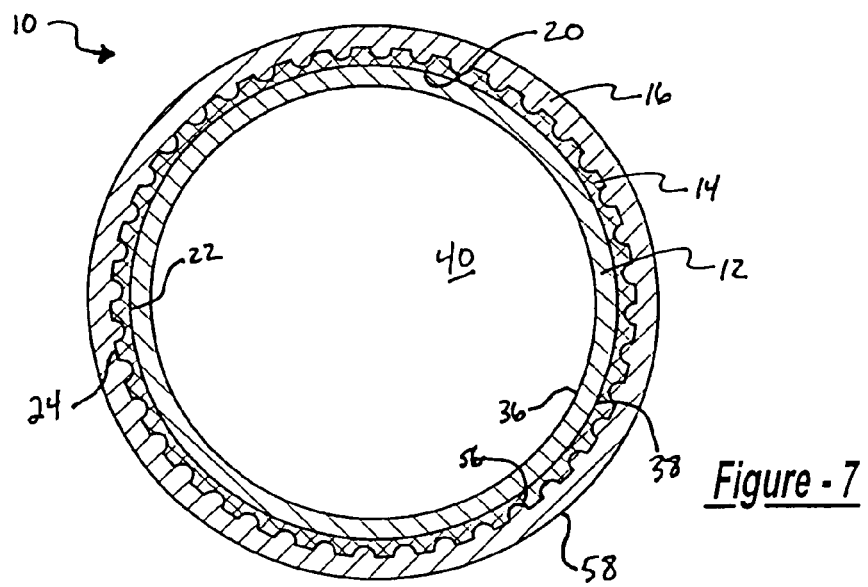
FIG. 7 is a cross sectional view of a preferred embodiment of the shaft assembly taken along line 7—7 in FIG. 6.

FIGS. 5 and 6 illustrate an alternate embodiment of the assembly 10 according to the present invention. In this embodiment, dimples 78 are present on the outer sleeve 16. The dimples 78 serve to provide a mechanism to lock the outer sleeve 16 to the shaft 14 in the assembly 10. This locking is achieved by complimentary undulating patterns in the area of contact between the outer sleeve 16 and the shaft 14. The undulating pattern on the interior surface 56 of the outer sleeve 16 is preferably formed by the dimples 78. The undulating pattern on the shaft 14 is preferably formed during fabrication of the assembly 10 due to the presence of the dimples 78, which will be developed more fully below. Alternatively, the shaft 14 can form recesses complimentary in size and shape to the dimples 78, thereby defining an undulating pattern. Preferably, the dimples 78 are integrally formed by the interior surface of the outer sleeve 16. Alternatively, the dimples 78 can comprise separately attached members, preferably metal. In general, the dimples 78 are small, raised bumps having a slight curvature. Preferably, the dimples 78 are circular in shape and are positioned about the entire interior surface 56 of the outer sleeve 16 at regular intervals. Particularly preferred is an arrangement of dimples 78 positioned equidistant from each other. Alternatively, the dimples 78 can have an elongated shape or any other shape so long as the raised nature of the dimples 78 as compared to the area of the surface not having dimples 78 is retained. Furthermore, the dimples 78 can be positioned on the interior surface 56 in any given pattern, including random placement and higher or exclusive placement at areas of greater stress. Ultimately, the size, shape, position, and orientation of the dimples 78 will depend on the specific load requirements of the assembly 10. The exterior surface 58 of the inner sleeve 12 can also include dimples 78 in the same manner described above for the outer sleeve 16.

A preferred method of fabricating the assembly 10 of the present invention will now be described. The assembly 10 of the present invention can be fabricated from its component parts by utilizing a sizing tool capable of expanding the inner sleeve 12 and compressing the outer sleeve 16. In a first step 80 of the preferred method of fabricating the assembly 10, appropriate components are selected. In the selection step, the shaft 14, inner sleeve 12, and outer sleeve 16 are selected in accordance with the requirements of the present invention. Thus, a shaft 14 is selected as appropriate for the function to which the assembly 10 will be applied. The inner sleeve 12 and outer sleeve 16 are selected based upon the material appropriate for the ultimate use of the assembly 10. Also, the sleeves 12, 16 are selected based upon size appropriate for use with the selected shaft 14 in accordance with the assembly 10 of the present invention. The outer diameter 52 of the inner sleeve 12 must allow the inner sleeve 12 to slideably fit within the inner cavity 18 of the end portion 26 of the shaft 14. Also, the outer diameter 52 of the inner sleeve 12 must be large enough to allow the inner sleeve 12 to be positioned adjacent the inner surface 22 of the end portion 26. Similarly, the inner diameter 72 of the outer sleeve 16 must allow the outer sleeve 16 to slide over the end portion 26 of the shaft 14. Also, the inner diameter 72 of the outer sleeve 16 must be small enough to allow the outer sleeve 16 to be positioned adjacent the outer surface 24 of the shaft 14.

Prior to placing the sleeves 12, 16 in position, the sleeves can be secured 82 to each other by forming a weld joint or other securement means at the interface between the flanges 50, 70 if desired. Alternatively, this securement can be performed at any subsequent point in the fabrication process or may be omitted.

In a next step 84, the inner 12 and outer 16 sleeves are positioned at the desired locations of the shaft end portion 26. This is accomplished by placing at least the first region 42 of the inner sleeve 12 inside the inner cavity 18 of the shaft 14, and placing at least the first region 62 of the outer sleeve 16 over the end portion 26 of the shaft 14. If one or both angles 46, 66 are present, proper positioning of the sleeve(s) 12, 16 can be accomplished by moving the sleeve(s) along the shaft 12 until the angle(s) 46, 66 are in contact with the opening 20. If the shaft 14 includes a tapered portion 30, proper positioning of the inner sleeve 12 can be accomplished by moving the inner sleeve 12 along the shaft 12 until interaction with the taper portion 30 of the shaft 14 is achieved.

Figure 8:
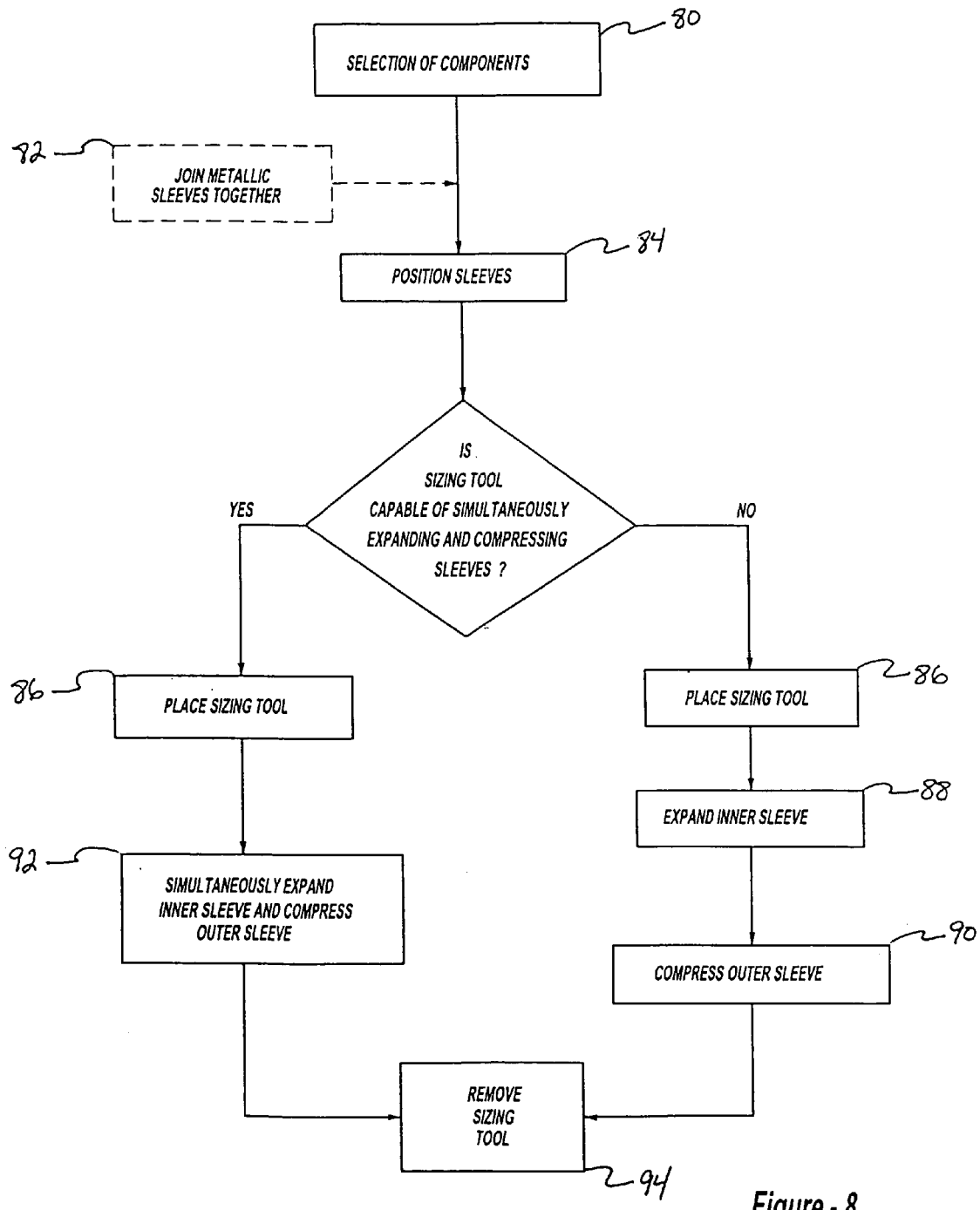
FIG. 8 is a flow diagram of a preferred method of making a shaft assembly, in accordance with the present invention.

Once the inner 12 and outer 16 sleeves are in their desired positions, a sizing tool of appropriate size is placed 84 about the assembly 10. If the sizing tool is only capable of performing a single sizing operation at one time, it is preferred that the tool expand the inner sleeve 12 first, and then compress the outer sleeve, as depicted in steps 88 and 90 of FIG. 8. Alternatively, any order can be used. If the tool is capable of simultaneously expanding the inner sleeve 12 and compressing the outer sleeve 16, the appropriate portions of the tool are placed within the inner sleeve 12 and around the outer sleeve 16. In this position, the sizing tool is able to simultaneously expand and compress (step 92) the inner 12 and outer 16 sleeves, respectively, thereby achieving the preferred adjacency between the exterior surface 56 of the inner sleeve 12 and the inner surface 22 of the shaft 14 and the interior surface 38 of the outer sleeve 16 and the outer surface 24 of the shaft 14. Preferably, a hydraulic sizing tool of appropriate size is utilized for this step of the fabrication process. Also preferable, the sizing tool is capable of simultaneously expanding the inner sleeve 12 and compressing the outer sleeve 16. A tube sizing machine, such as the I/O 3000 from Eagle Eaton Leonard, capable of performing both inner diameter and outer diameter manipulations, is preferred.

Once in position, the sizing tool is activated to expand 86 the inner sleeve 12 and compress 88 the outer sleeve 16. The expansion and compression preferably occur simultaneously 92. Thus, in a preferred method, the sizing tool is activated to simultaneously expand the inner sleeve 12 until contact is made with the composite shaft 14 and compress the outer sleeve 16 against the shaft 14. Both actions force the respective sleeve onto the shaft 14, thereby forming the assembly 10 of the present invention. Alternatively, the expansion and compression can occur independently of each other, and in either order. If dimples 78 are present on either sleeve 12, 16, the expansion and compression preferably proceed until an undulating pattern is formed at the interface of the respective sleeves 12, 16 and shaft 14, thereby achieving a mechanical lock between the sleeves 12, 16 and the shaft 14.

Lastly, the finished assembly 10 is removed 94 from the sizing tool. The preferred method of fabricating the assembly 10 is now complete.

The foregoing disclosure is the best mode devised by the inventors for practicing the invention. It is apparent, however, that several variations in assemblies of composite shafts and metallic ends and methods of fabricating such assemblies in accordance with the present invention may be obvious to one skilled in the art. Inasmuch as the foregoing disclosure is intended to enable one skilled in the pertinent art to practice the instant invention, it should be not construed to be limited thereby, but should be construed to include such aforementioned obvious variations. As such, the present invention should be limited only by spirit and scope of the following claims.

The invention claimed is:

1. A method of fabricating a shaft assembly comprising:
   selecting a cured composite shaft member having an end portion defining a cavity, the end portion having an inner surface and an outer surface;
   selecting a metallic inner sleeve having an exterior surface;
   selecting a metallic outer sleeve having an interior surface;
   disposing the inner sleeve within the cavity of the end portion of the shaft;
   disposing the outer sleeve around the end portion of the shaft;
   expanding the inner sleeve such that the exterior surface is adjacent the inner surface of the end portion of the shaft; and
   compressing the outer sleeve such that the interior surface of the outer sleeve is adjacent the outer surface of the end portion of the shaft.

2. The method of claim 1, wherein the inner sleeve further comprises a first flange and the outer sleeve further comprises a second flange.

3. The method of claim 2, further comprising forming a joint between the first and second flanges.

4. The method of claim 3, wherein the forming a joint includes forming a weld joint.

5. The method of claim 1, wherein the steps of expanding the inner sleeve and compressing the outer sleeve are performed simultaneously.

6. The method of claim 1, wherein the step of expanding the inner sleeve is performed after the step of compressing the outer sleeve.

7. The method of claim 1, wherein the outer sleeve further comprises at least one dimple positioned on the interior surface of the outer sleeve.

8. The method of claim 7, wherein the compressing the outer sleeve continues until an undulating interface is formed between the interior surface of the outer sleeve and the outer surface of the shaft.

9. The method of claim 1, wherein the inner sleeve further comprises at least one dimple positioned on the exterior surface of the inner sleeve.

10. The method of claim 9, wherein the step of expanding the inner sleeve continues until an undulating interface is formed between the exterior surface of the inner sleeve and the inner surface of the shaft.

11. A method of fabricating a shaft assembly having a hollow composite shaft, a metallic inner sleeve, and a metallic outer sleeve, the method comprising:
    placing the inner sleeve within the composite shaft;
    placing the outer sleeve around the composite shaft;
    expanding the inner sleeve such that the inner sleeve engages the composite shaft; and
    compressing the outer sleeve such that the outer sleeve engages the composite shaft, the compressing step occurring simultaneously with the expanding step.

12. The method of claim 11, wherein the inner sleeve and the outer sleeve each include a connection portion engaging the composite shaft and a flange portion extending from the composite shaft.

13. The method of claim 12, further comprising the step of attaching the flange portions of the inner sleeve and outer sleeve together.

14. The method of claim 13, wherein the step of attaching the flange portions occurs prior to the expanding and compressing steps.

15. The method of claim 13, wherein the flange portions are attached by a weld.

16. The method of claim 12, further comprising the step of forming connection features in the flange portions.

17. The method of claim 12, wherein at least one of the inner sleeve and outer sleeve includes an angled portion positioned between the connection portion and the flange portion.

18. The method of claim 17, wherein the flange portions of the inner and outer sleeves define a cavity therebetween, and further comprising the steps of:
    attaching the flange portions of the inner sleeve and outer sleeve together; and
    placing the composite shaft within the cavity.

* * * * *